United States Patent [19]
Compton

[11] Patent Number: 5,455,622
[45] Date of Patent: Oct. 3, 1995

[54] SIGNAL PROCESSING APPARATUS AND METHOD FOR OFFSET COMPENSATION OF CCD SIGNALS

[75] Inventor: John T. Compton, LeRoy, N.Y.

[73] Assignee: Eastman Kodak Company, Rochester, N.Y.

[21] Appl. No.: 263,227

[22] Filed: Jun. 21, 1994

[51] Int. Cl.[6] ................................................. H04N 5/16
[52] U.S. Cl. ........................... 348/229; 348/257; 348/222
[58] Field of Search .................................... 348/229, 222, 348/257, 677, 673, 691; 358/170, 171, 41; H04N 5/16, 5/202

[56] References Cited

U.S. PATENT DOCUMENTS

| | | | |
|---|---|---|---|
| 4,660,082 | 4/1987 | Tomohisa et al. | 358/163 |
| 5,047,861 | 9/1991 | Houchin et al. | 358/213.15 |
| 5,361,140 | 11/1994 | Hayenga | 348/257 |

FOREIGN PATENT DOCUMENTS 2306774  12/1990  Japan.

*Primary Examiner*—James J. Groody
*Assistant Examiner*—Sherrie Hsia
*Attorney, Agent, or Firm*—Francis H. Boos, Jr.

[57] ABSTRACT

A bipolar CCD signal processing circuit and method in which offset in a non-zero dark level of the CCD signal which is induced by pixel-to-pixel gain adjustment is compensated by applying a proportionate amount of the gain compensation component of the gain signal to the gain-adjusted CCD signal to compensate for the gain-induced offset whereby the dark level of the gain-adjusted CCD signal is substantially restored on a pixel-to-pixel basis to its predetermined non-zero value. When gain-induced offset compensation is employed, the range of any separately applied compensation for pixel-to-pixel offsets, other than those induced by gain compensation, is substantially reduced.

5 Claims, 2 Drawing Sheets

SIGNAL PROCESSING APPARATUS AND METHOD FOR OFFSET COMPENSATION OF CCD SIGNALS

FIELD OF THE INVENTION

This invention relates generally to CCD signal processing circuits and more specifically to analog bipolar signal processing circuits employing gain and offset compensation of CCD signals on a pixel-to-pixel basis.

BACKGROUND OF THE INVENTION

A charge coupled device (CCD) imager contains an array of light detecting sites, referred to herein as "pixels", which accumulate charge depending on the light energy projected onto them. After some charge accumulation time, the charges in the light detecting pixels are transferred to a charge shifting structure so that the charges may be shifted out of the CCD and measured by signal processing circuits to derive a signal representative of the image projected onto the CCD. Due to manufacturing variability in the CCD structure, light source non-uniformities, dust or other contaminants in the optical path which projects the image onto the CCD, or for other reasons, the response of the individual light detecting pixels can be non-uniform from pixel-to-pixel. It is well known to compensate for these pixel-to-pixel variations in the charge measuring process, for example by multiplying the output value of the signal for each pixel by a gain value and adding an offset value. These compensating values are usually determined on a pixel-to-pixel basis during a calibration process and stored for use during image sensing. The result is to make the responsiveness of all the pixels substantially equal.

In analog CCD signal processing circuits, $V_{dark}$ represents the signal from a CCD pixel which is not exposed to light. Hence, $V_{dark}$ is the lowest value limit of the signal from the CCD since the signal cannot go beyond $V_{dark}$. If $V_{dark}$ is nominally at zero volts, then the signal in the CCD signal processing circuits will always be either positive or negative. This is a so-called unipolar circuit because all signal processing takes place in a single quadrant. In this case, the application of a compensating gain value will not affect the nominal $V_{dark}$ level, because zero volts multiplied by any value remains zero volts. On the other hand, it may be desirable to make $V_{dark}$ and the maximum signal level, $V_{sat}$, equal and opposite in polarity in order to make optimum use of the operating ranges of the circuit devices in the signal processing path. This is a so-called bipolar circuit because all signal processing takes place in two quadrants. In this case, however, a problem arises in that a change in the compensating gain value will cause an unwanted change in $V_{dark}$ from its nominal value. There is therefore a need to provide a CCD bipolar signal processing circuit that compensates for this adverse effect caused by gain changes introduced for signal compensation purposes. The present invention satisfies this need.

SUMMARY OF THE INVENTION

In accordance with the invention, therefore, analog signal processing apparatus is provided for a CCD sensor which comprises, in part, means for supplying a CCD sensor signal having a dark level established at a predetermined non-zero value. The apparatus also includes a pixel-to-pixel gain compensation signal generator and a multiplier circuit for multiplying the CCD sensor signal with the gain compensation signal to produce a pixel-to-pixel gain-adjusted CCD signal having gain-induced variations in dark level from the predetermined non-zero value. According to a particular feature of the invention, the signal processing apparatus further includes circuit means for applying a proportionate amount of the gain compensation signal to the gain-adjusted CCD signal to provide offset compensation for the gain-induced variations in dark level whereby the dark level of the gain-adjusted CCD signal is substantially restored to the predetermined non-zero value.

In accordance with the method of the invention, signal processing of CCD signals in a bipolar analog signal processing circuit comprises the steps of supplying a CCD sensor signal having a dark level at a predetermined non-zero value; multiplying the CCD signal with a pixel-associated gain compensation signal for compensating the CCD signal for pixel-to-pixel variations in signal gain, the gain compensation causing variations in dark level in the CCD signal from the predetermined non-zero value; and then adding a proportionate amount of the gain compensation signal to the gain-compensated CCD signal as gain-induced offset compensation to restore the dark level of the gain-compensated signal to the predetermined non-zero value.

DETAILED DESCRIPTION

Figure 1:
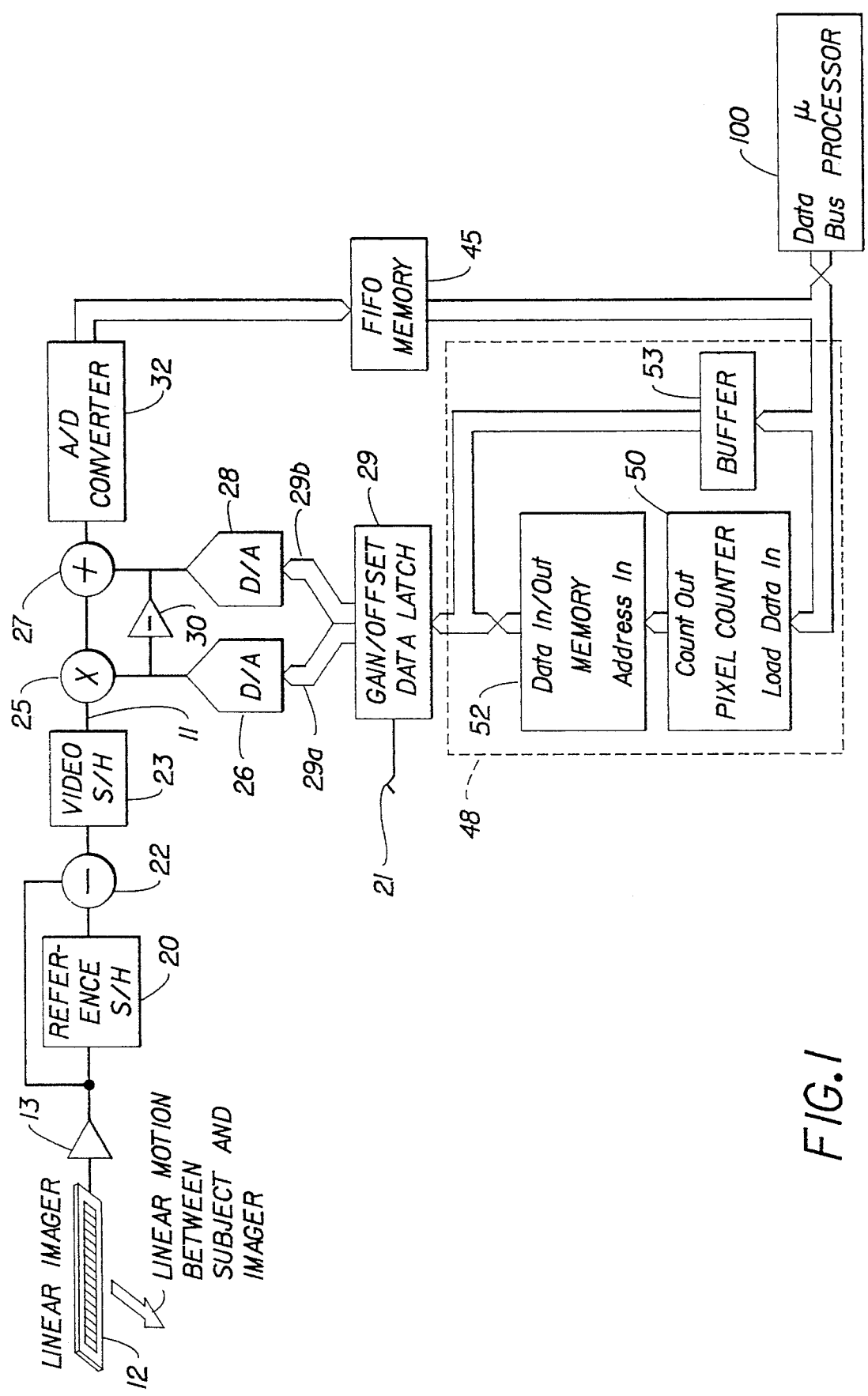
FIG. 1 is a schematic block diagram of a signal processing circuit embodying the present invention.

Referring now to FIG. 1, there is shown a system for processing raw CCD signals into a form suitable for conversion into digital data signals for subsequent digital processing. The system shown includes analog signal processing apparatus shown generally at 10 for performing gain and offset compensation in analog space in accordance with the invention. The apparatus of the invention includes means such as input terminal 11 for supplying a CCD sensor signal having a dark level established at a predetermined non-zero value. To this end, a CCD signal from a CCD linear imager 12 is applied via a buffer amplifier 13 to an input of a reference sample and hold (S/H) circuit 20 and also to a summing junction 22. For each pixel of the CCD sensor, the output signal therefrom has a reference level phase at, for example, +1.25 v and a video level phase which can vary between, for example, ±1.25 v. The CCD signal is sampled in S/H circuit 20 during the reference phase and the sampled signal is combined in summing junction 22 with the original CCD signal to produce a CCD signal which then has the predetermined non-zero dark level, in this case +1.25 v. The output of the summing junction 22 is applied to a video S/H circuit 20 where the CCD signal is sampled during the video phase to produce a CCD video signal that has the dark reference level phase removed and is corrected for changes in dark reference level.

The signal processing apparatus also includes a pixel-to-pixel gain and offset signal generator comprising microprocessor 100, addressable storage module 48, gain/offset data latch 29 and digital-to-analog (D/A) converters 26 and 28. During an initial calibration operation, gain and offset digital correction data is derived for each pixel of the CCD 12 under the control of microprocessor 100 and stored via buffer 53 in a memory 52 of module 48. Addressing of the gain and offset data in memory 52 for storage and access purposes is controlled by pixel counter 50. During video operation of the CCD, 8 bit bytes of gain and offset data are read out sequentially from memory 52 in synchronism with the pixel information of the CCD signal by means of the pixel counter 50 and momentarily stored in a 16 bit latch 29. Latch 29 is operated by a latch control signal on line 21 in synchronism with the availability of gain and offset data for each pixel from memory 52 to apply the gain and the offset data via data buses 29a and 29b to gain and offset digital-to-analog (D/A) converters 26 and 28, respectively, for conversion to analog signals.

The analog signal processing apparatus 10 also includes a multiplier circuit 25 which is operative to multiply the CCD video signal from video S/H circuit 23 and input terminal 11 with the gain signal from D/A 26 to produce a gain-adjusted CCD signal. Apparatus 10 also includes a summing circuit 27 to which offset compensation signals are applied to be added to the gain-adjusted CCD signal from multiplier circuit 25 to provide offset compensation for pixel-to-pixel shifts in dark level of the CCD signal. One source of offset compensation signal is the analog signal from D/A circuit 28 which provides a limited amount of offset compensation for pixel-to-pixel variation in offset resulting from sensor characteristics, etc. as mentioned above. The limited nature of the offset compensation from the D/A circuit 28 will be described in greater detail subsequently.

In addition to the pixel-to-pixel offset variations just mentioned, the gain-adjusted CCD signal at the input of summing circuit 27 also includes substantial offset variations in the CCD signal dark level that are not a function of the sensor-related factors but are induced by the gain adjustment applied in multiplier circuit 25. These offset variations are caused by the variations in the gain signal from a nominal value corresponding to zero gain adjustment. These variations in the gain signal represent a gain compensation component which produces the gain-induced offset in the gain adjusted CCD signal. In accordance with an important feature of the invention, the signal processing apparatus 10 also includes means, diagrammatically shown as inverting amplifier 30, for applying a proportionate amount of the gain compensation component of the gain signal from A/D circuit 26 to the gain-adjusted signal at the input of summing circuit 27 to provide offset compensation for the gain-induced variations in dark level of the CCD signal. As will be explained in more detail later, the effect of the application of a proportionate amount of gain-induced offset at the summing circuit is to substantially restore the dark level of the CCD signal to the predetermined non-zero value (+1.25 v) that was established before application of the gain compensation. The now fully compensated analog CCD signal is then applied to A/D converter 32 where it is converted to digital form for storage in first-in/first-out (FIFO) memory 45 for subsequent use in digital image processing circuits.

Figure 2:
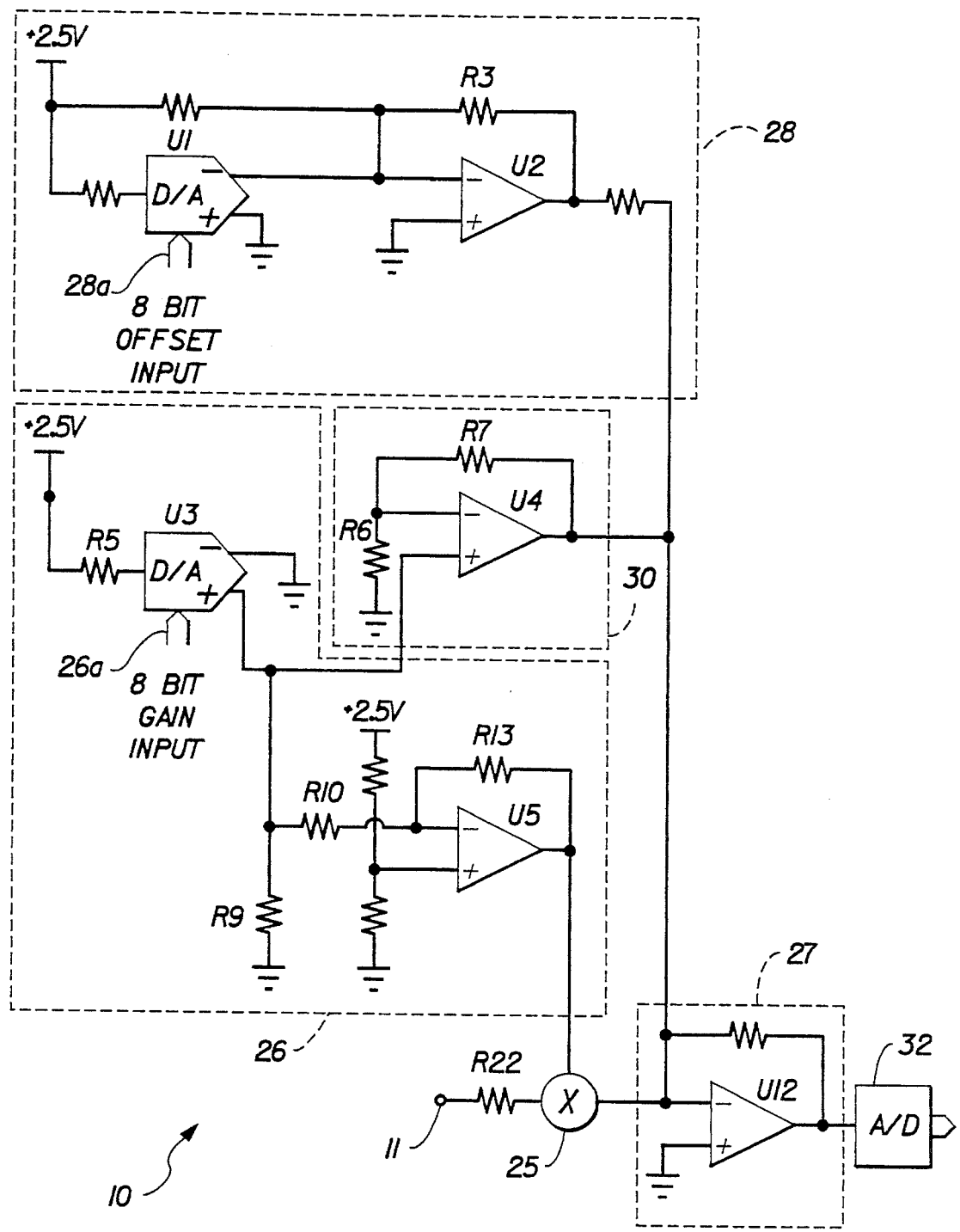
FIG. 2 is a detailed circuit diagram of a portion of the diagram of FIG. 1 illustrating the novel features of the invention.

A more detailed circuit diagram for the gain and offset analog signal processing apparatus 10 is shown in FIG. 2. As shown therein, the input CCD signal with dark level at +1.25 v is applied via coupling resistor R22 to multiplier circuit 25. In the D/A gain compensation channel 26, an 8 bit gain compensation digital data signal from latch 29 is coupled to the input of D/A circuit U3 for conversion to an analog gain current representing the gain compensation component of the gain signal. As the digital count input to U3 goes from zero to 255, the positive output of U3 provides a current which goes from zero to some upper limit set by an input current developed by R5 and the +2.5 v reference source.

The positive output of U3 is buffered and level shifted by op-amp U5 to provide the desired gain voltage input to multiplier 25, consisting of 1 v plus or minus the value of the gain compensation component, for multiplication with the CCD signal to produce a gain adjusted CCD signal. This gain-adjusted signal is then coupled to the negative input side of summing op-amp U12 for application to A/D converter 32. The gain adjustment voltage output from op-amp U5 is centered on +1.0 v, corresponding to a digital input count of 128, and has a range established by resistors R9, R10 and R13 which varies from +0.75 v at an input digital count of zero, to +1.25 v at a count of 255. At a count of 128, the 1.0 v input to multiplier 25 produces zero gain adjustment and zero effect on the dark level of the CCD signal. However, at a count of 255, the +1.25 v multiplier, while producing the desired gain adjustment, also undesirably shifts the dark level of the CCD signal to 1.5625 v. Similarly, with a zero count, the 0.75 v multiplier shifts the CCD signal dark level to 0.9375 v.

To compensate for these gain-induced offsets in accordance with the invention, circuit means 30, including inverting op-amp U4, is provided between the positive current output of gain compensation D/A U3 and the summing node of op-amp U12 to apply a proportionate amount of the gain compensation component of the gain signal to the gain-adjusted CCD signal from multiplier 25 to restore the dark level of the gain-adjusted CCD signal to the predetermined non-zero value, in this case to +1.25 v. For the example circuit of FIG. 2, the values of resistors R7 and R6 are set such that output voltage from op-amp U4 is −1.25 times the gain compensation component of the voltage at the output of op-amp U5. In the operation of the gain channel of D/A U3 and op-amp U5, as the digital count into the D/A U3 rises, the current into the positive current side of the D/A increases causing the voltage at the junction of R10 and R9 to drop. This negative-going voltage is the gain compensation component and is coupled to the positive input of op-amp U4. Thus while a rising input count causes a positive-going output voltage of op-amp U5, the proportionate voltage output of op-amp is of the right polarity when applied to op-amp U12 to compensate for the gain induced effect on dark level in the gain-adjusted CCD signal.

In separate offset compensation circuit 28, an 8 bit offset compensation digital data signal is applied to D/A circuit U1 for conversion to an analog offset compensation signal. This signal is then applied via op-amp U2 to the negative input side of summing op-amp U12 for addition to the CCD signal to provide offset compensation. As previously noted, multiplication of the CCD signal by the gain voltage from U5 causes an unwanted shift in the dark level of the CCD signal for all gain values other than "1". For the aforementioned range of gain values from 0.75 v to 1.25 v, the range of offset shifts in CCD dark level can be 0.625 v which is the difference between the maximum and minimum offset levels of 1.5625 v and 0.9375 v respectively. Previously, the range of offset compensation from a separate offset compensation circuit, such as circuit 28, had to be sufficient to compensate for these gain induced offset shifts. However, the per step adjustment available with an 8 bit D/A for offset compensation needed to accommodate the range of gain-induced offset shifts has been found to be too coarse to compensate for the relatively small pixel-to-pixel offset shifts that are not gain-induced and that can occur for the sensor-related reasons described above. While a 12 or 16 bit data channel for separate offset compensation might provide sufficiently fine adjustment to simultaneously compensate the large range of gain-induced offset shifts and the much smaller pixel-topixel offset variations, the added cost and complexity of such an arrangement makes the use of higher bit content offset data channel impractical. However, with the gain-induced offset compensated by the proportionate output of op-amp U4, the separate offset adjustment provided by offset op-amp U2 can now be set by appropriate selection of the value of resistor R3 to have very fine adjustment steps in order to provide compensation only for any of the residual, relatively small pixel-to-pixel variations in offset which are generated by factors other than gain-induced offset. For example, without the gain-induced offset compensation circuit 30, the range of separate offset compensation required would be ±0.32 v while, with the compensation circuit 30, the separate offset compensation is reduced to ±0.08 v. In some instances, where the residual offset variations are sufficiently small to be acceptable, the separate offset compensation circuit 28 can be eliminated entirely, with only the gain-induced offset being compensated by circuit 30.

It will be appreciated that what has been described is a low cost apparatus and method for compensating for gain-induced offset in a bipolar analog signal processing circuit that provides effective compensation without the need for costly digital data devices.

The invention has been described with reference to a preferred embodiment. However, it will be appreciated that variations and modifications can be effected by a person of ordinary skill in the art without departing from the scope of the invention.

PARTS LIST 10 analog signal processing apparatus
11 input terminal
12 CCD linear imager
13 buffer amplifier
20 reference sample-and-hold circuit
22 summing junction
23 video sample-and-hold circuit
25 multiplier circuit
26 gain compensation digital-to-analog circuit
27 summing circuit
28 offset compensation digital-to-analog circuit
29 gain/offset data latch
29a gain data bus
29b offset data bus
30 gain-induced proportionate signal circuit
32 analog-to-digital data converter circuit
45 first-in/first-out memory
48 addressable data storage module
50 pixel counter
52 memory
53 data buffer
U1 offset data D/A converter
U2 offset compensation op-amp
U3 gain data D/A converter
U4 proportionate offset compensation op-amp
U5 gain compensation op-amp
U12 summing/inverting op-amp
100 microprocessor

What is claimed is:

1. Analog signal processing apparatus for a CCD sensor comprising:

means for supplying a CCD signal having a dark level established at a predetermined non-zero value;

a pixel-to-pixel gain compensation signal generator for generating a gain signal including a gain compensation component;

a multiplier circuit for multiplying said CCD signal with said gain signal to produce a pixel-to-pixel gain-adjusted CCD signal having gain-induced variations in the dark level from said predetermined non-zero value caused by said gain compensation component; and circuit means for applying a proportionate amount of said gain compensation component to said gain-adjusted CCD signal to provide offset compensation for said gain-induced variations in the dark level whereby the dark level of said gain-adjusted CCD signal is substantially restored to said predetermined non-zero value.

2. The signal processing apparatus of claim 1 wherein said circuit means is coupled from said gain compensation signal generator to an output of said multiplier circuit.

3. The signal processing apparatus of claim 1 further including a pixel-to-pixel offset compensation signal generator for generating a limited range of offset compensation which is substantially less than that needed to compensate for the range of the gain-induced variations in the dark level, said limited range of offset compensation having relatively fine adjustment levels appropriate for compensation of pixel-to-pixel offset other than that induced by said gain compensation component.

4. A method of offset compensation of CCD signals in a signal processing circuit comprising the steps of:

supplying a CCD sensor signal having a dark level at a predetermined non-zero value;

multiplying said CCD sensor signal with a pixel-associated gain signal for adjusting said CCD sensor signal for pixel-to-pixel variations in signal gain thereby producing a gain-adjusted CCD signal, said gain signal including a gain compensation component causing variations in the dark level in the gain-adjusted CCD signal from said predetermined non-zero value; and adding a proportionate amount of said gain compensation component to said gain-adjusted CCD signal as gain-induced offset compensation to restore the dark level of the gain-adjusted CCD signal substantially to said predetermined non-zero value.

5. The method of claim 4 further including the step of adding offset compensation separate from the gain-induced offset compensation, said separate offset compensation having relatively fine adjustment steps suitable for pixel-to-pixel compensation of offset other than that induced by said gain compensation component.

* * * * *